(12) United States Patent
Hur

(10) Patent No.: US 7,450,338 B2
(45) Date of Patent: Nov. 11, 2008

(54) HARD DISK DRIVE COVER WITH PROTRUDING BLADES FOR REDUCING DISK AND HGA VIBRATION

(75) Inventor: Sung-chul Hur, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 420 days.

(21) Appl. No.: 11/019,172

(22) Filed: Dec. 23, 2004

(65) Prior Publication Data

US 2005/0185325 A1    Aug. 25, 2005

(30) Foreign Application Priority Data

Feb. 19, 2004    (KR) .................... 10-2004-0011003

(51) Int. Cl.
   G11B 17/00    (2006.01)
   G11B 33/14    (2006.01)
(52) U.S. Cl. .................................... 360/97.02
(58) Field of Classification Search ............. 360/97.02; 720/655, 648, 651; 420/651
   See application file for complete search history.

(56) References Cited

U.S. PATENT DOCUMENTS

| | | | |
|---|---|---|---|
| 4,885,652 A * | 12/1989 | Leonard et al. ............. 360/133 |
| 5,140,578 A | 8/1992 | Tohkairin ................... 720/648 |
| 5,422,775 A * | 6/1995 | Martin ....................... 360/133 |
| 5,453,890 A | 9/1995 | Takegami et al. ......... 360/97.02 |
| 5,687,048 A * | 11/1997 | Mizuta ....................... 360/133 |
| 5,886,850 A * | 3/1999 | Kaczeus et al. .......... 360/97.01 |
| 6,236,532 B1 * | 5/2001 | Yanagisawa ............. 360/97.02 |
| 6,407,879 B1 | 6/2002 | Frugé et al. .............. 360/97.02 |
| 6,473,264 B2 | 10/2002 | Bae et al. ................ 360/97.02 |
| 6,493,310 B1 | 12/2002 | Kim et al. .................... 720/611 |
| 6,643,251 B1 * | 11/2003 | Ikuta et al. ................... 720/703 |
| 6,791,790 B2 * | 9/2004 | Lee ............................ 360/97.02 |
| 7,069,570 B2 * | 6/2006 | Choi et al. ................... 720/725 |

(Continued)

FOREIGN PATENT DOCUMENTS

JP        62062495        3/1987

(Continued)

OTHER PUBLICATIONS

European Search Reported for Application No. 05002287.0-1239- dated Jul. 1, 2005.

(Continued)

Primary Examiner—Brian E. Miller
Assistant Examiner—Matthew G Kayrish
(74) Attorney, Agent, or Firm—Staas & Halsey LLP

(57) ABSTRACT

A hard disk drive having a housing with a base and a cover connected to each other, a spindle motor connected to the base, a disk mounted on the spindle motor and rotating with respect to the base, and an actuator rotatably connected to the base and supporting a slider with a magnetic head mounted on a front end thereof. The magnetic head writes and/or reads data to and/or from the disk. The hard disk drive also has a blade protruding from a surface of the base and/or a portion of the cover facing the disk. The blade guides an air flow caused by rotation of the disk toward an outer edge of the disk.

11 Claims, 6 Drawing Sheets

U.S. PATENT DOCUMENTS

| | | | |
|---|---|---|---|
| 2001/0017744 A1 | 8/2001 | Bae et al. | 360/97.02 |
| 2003/0179492 A1* | 9/2003 | Kang et al. | 360/97.02 |
| 2005/0270691 A1* | 12/2005 | Pottebaum et al. | 360/97.02 |
| 2006/0005214 A1* | 1/2006 | Kim et al. | 720/648 |
| 2006/0080688 A1* | 4/2006 | Soeda et al. | 720/648 |
| 2006/0259917 A1* | 11/2006 | Tokunaga | 720/649 |

FOREIGN PATENT DOCUMENTS

| | | |
|---|---|---|
| JP | 04-106781 | 4/1992 |
| JP | 08-293191 | 11/1996 |
| JP | 11-297037 | 10/1999 |
| JP | 11297037 A * | 10/1999 |
| JP | 11-317065 | 11/1999 |
| JP | 2000-156060 | 6/2000 |
| JP | 2000-357385 | 12/2000 |
| JP | 2001-250301 | 9/2001 |
| KR | 1999-0085969 | 12/1999 |
| KR | 1020030068261 | 8/2003 |
| KR | 2003-0086072 | 11/2003 |

OTHER PUBLICATIONS

Korean Office Action mailed Oct. 25, 2005; Application No. 10-2004-0011003.

* cited by examiner

HARD DISK DRIVE COVER WITH PROTRUDING BLADES FOR REDUCING DISK AND HGA VIBRATION

CROSS-REFERENCE TO RELATED APPLICATIONS

This application claims the benefit of Korean Patent Application No. 2004-11003, filed on Feb. 19, 2004, in the Korean Intellectual Property Office, the disclosure of which is incorporated herein by reference.

BACKGROUND OF THE INVENTION

1. Field of the Invention

The present invention relates to a hard disk drive, and more particularly, to a hard disk drive with a damping element attenuating vibration during operation of the hard disk drive.

2. Description of the Related Art

A hard disk drive is an auxiliary memory unit used in a computer, in which data is read from a magnetic disk and/or new data is written to the magnetic disk by use of a magnetic head. There has been increasing demand for a hard disk drive with a high speed, a high capacity and a low vibration, and several developments have been made to satisfy this demand.

FIG. 1 is an exploded view a conventional hard disk drive. Referring to FIG. 1, the hard disk drive 10 includes a disk 15, a spindle motor 20 to turn the disk 15 the spindle motor 20 being connected to a base 11, an actuator 30 supporting a magnetic read/write head 45 writing the data to the disk 15 and/or reading the data from the disk 15, and a cover 12 fastened to the base 11 that covers and protects components inside the hard disk drive 10.

The disk 15 is secured to a rotator of the spindle motor 20, and turns with respect to the base 11. On a surface of the disk 15, data indicating a position of the data to be written are previously recorded in tens of thousands of tracks formed along a circumference of the disk 15.

The actuator 30 is rotated around a pivot bearing 33 connected to the base 11 by a voice coil motor 32. The actuator 30 includes an arm 35 rotatably coupled to the pivot bearing 33, and a head gimbal assembly (HGA) 37 connected to the arm 35 supporting and biasing a slider 40, on which the magnetic head 45 is mounted, toward the surface of the disk 15.

When the disk 15 in the hard disk drive 10 is rotated, a lift force is generated in the hard disk drive by air pressure. The slider 40 is maintained in a floating state on the surface of the disk at a height at which the lift force generated by the rotation of the disk 15 is in equilibrium with an elastic force of the HGA 37. Accordingly, the magnetic head 45 mounted on the slider 40 is spaced a predetermined distance from the rotating disk 15 to write and/or read the data to and/or from the disk 15.

In the conventional hard disk drive 10, there may be vibration due to a structural characteristic or defect of the spindle motor 20, eccentricity of the disk 15, irregular air flow in the hard disk drive 10, etc. The vibration adversely affects a position error signal (PES) and a write/read error of the magnetic head 45, and increases noise, thereby deteriorating reliability of the hard disk drive.

To decrease vibration due to structural characteristics, a hydrodynamic bearing has been used in the spindle motor 20 of the hard disk drive. The spindle motor employing the hydrodynamic bearing can rotate the disk 15 at a high speed above 7200 rpm. When the disk 15 rotates at a high speed, air flow rotating in the same direction as the rotational direction of the disk as indicated by an arrow D is a major factor causing the disk 15, the actuator 30 and the hard disk drive 10 to vibrate. It is necessary to control the air flow rotating in the direction of arrow D to decrease the vibration of the disk 15, the actuator 30 and the hard disk drive 10 and thus improve the reliability of the hard disk drive.

SUMMARY OF THE INVENTION

The present invention solves the problems of the prior art and provides a hard disk drive with an element guiding air flow generated by the rotation of a disk to an outer edge of the disk to reduce vibration during operation.

According to an aspect of the present invention, there is provided a hard disk drive comprising: a housing including a base and a cover connected to the base; a spindle motor connected to the base; a disk mounted to the spindle motor and rotating with respect to the base; an actuator rotatably connected to the base and including a slider supported by the actuator and a magnetic head mounted on a front end of the slider, the magnetic head writing and/or reading data to and/or from the disk; and a plurality of blades protruding from at least one of a surface of the base or a portion of the cover facing the disk, and guiding an air flow, caused by rotation of the disk, toward an outer edge of the disk.

According to one aspect, respective lines connecting a first end of each of the blades adjacent to a center of the disk with a second end of the respective blades adjacent to the outer edge of the disk are inclined at a predetermined angle in a rotational direction of the disk from a line extending radially from the center of the disk.

According to one aspect each of the blades curves in a rotational direction of the disk from a first end adjacent to a center of the disk to a second end adjacent to the outer edge of the disk, to have a spiral shape.

According to one aspect, a surface of the blade on which the air flow caused by the rotation of the disk is incident is inclined to guide the air flow to a surface of the disk.

According to one aspect, the blade is disposed before the actuator with respect to a direction of air flow, to block the air flow caused by the rotation of the disk from flowing to the actuator.

According to one aspect, the hard disk drive further comprises a recursive filter outside an outer edge of the disk. Additionally, a first end of one of the blades adjacent to the outer edge of the disk is disposed before the recursive filter with respect to a direction of the air flow, to guide the air flow caused by rotation of the disk toward the recursive filter.

According to one aspect, the blades have the same shape, and are disposed at regular angular intervals.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
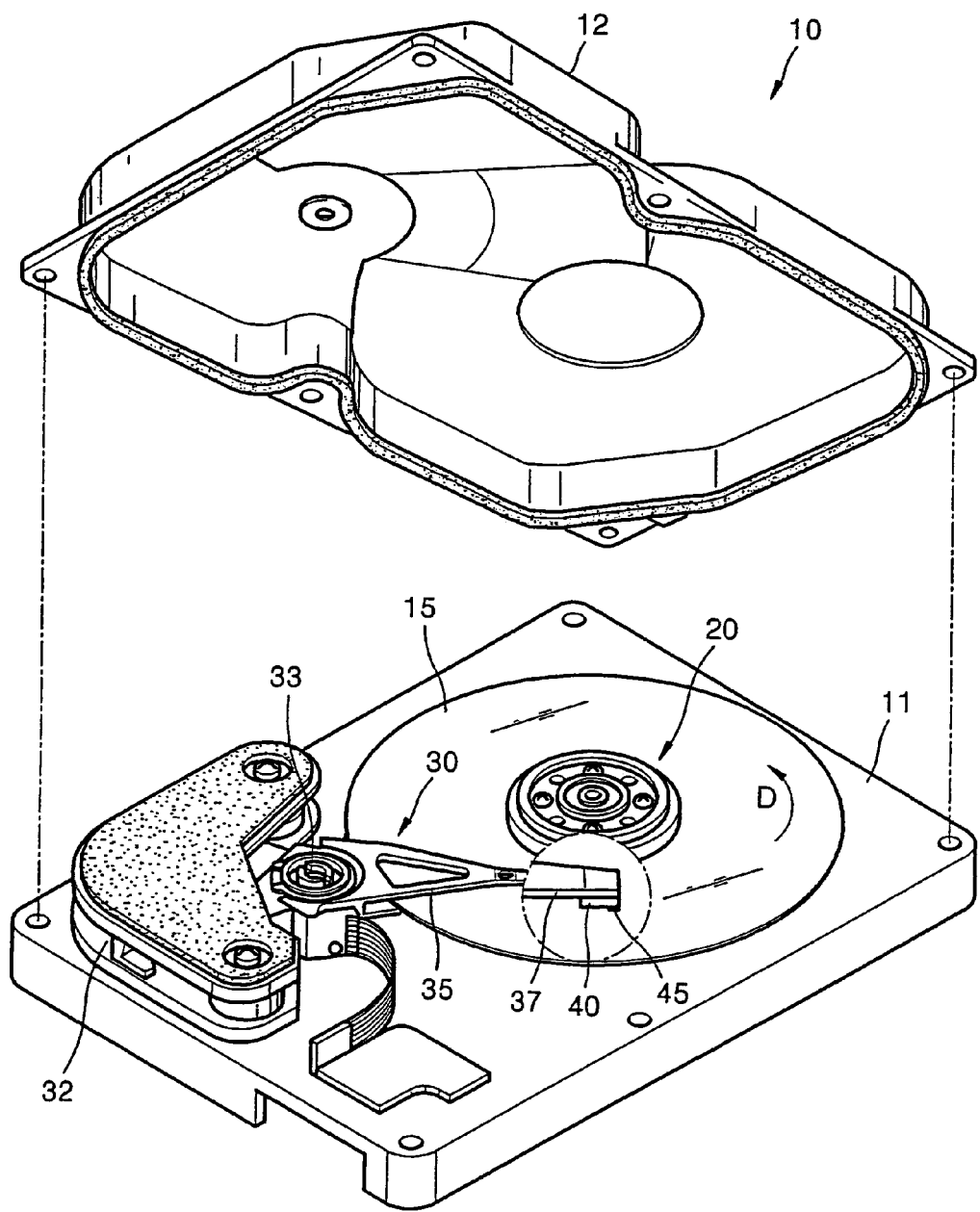
FIG. 1 is an exploded view of a conventional hard disk drive.

Reference will now be made in detail to embodiments of the present invention, examples of which are illustrated in the accompanying drawings, wherein like reference numerals refer to the like elements throughout. The embodiments are described to explain the present invention by referring to the figures.

Figure 2:
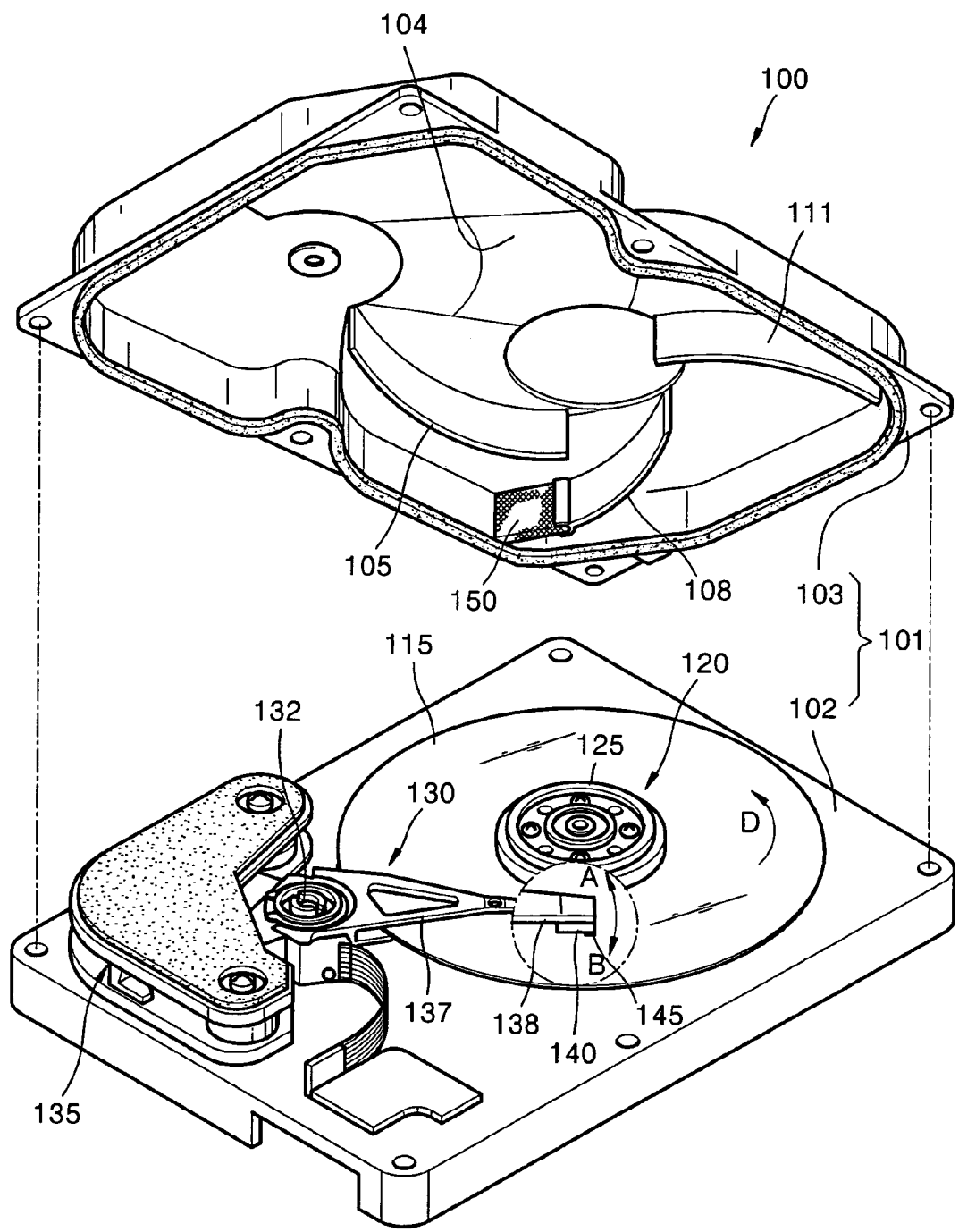
FIG. 2 is an exploded view of a hard disk drive according to an embodiment of the present invention.
Figure 3:
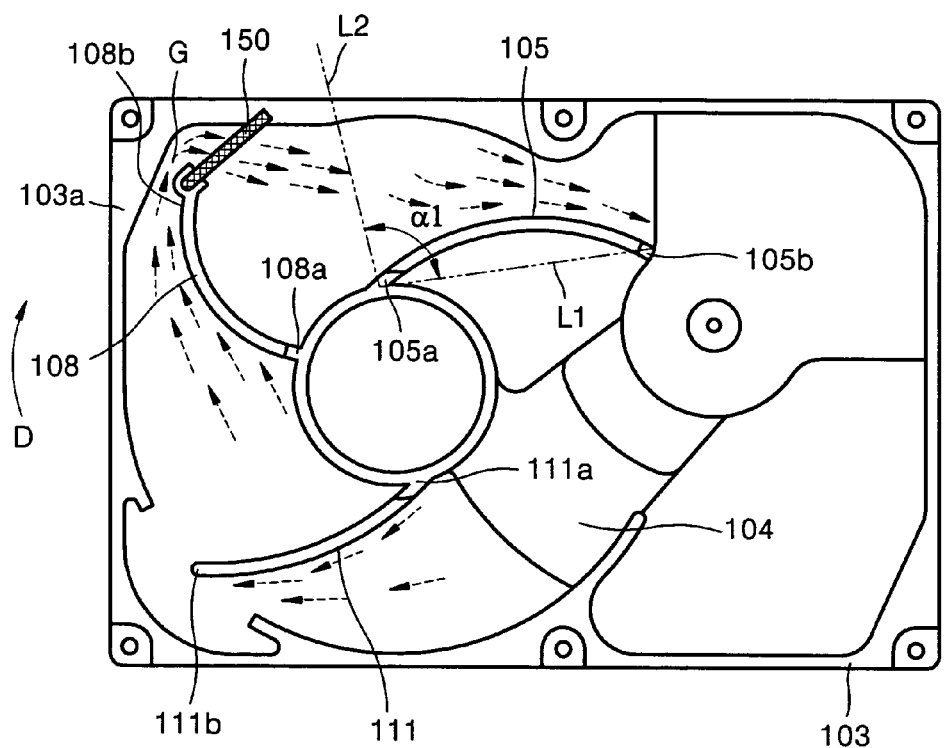
FIG. 3 is a bottom view of a cover of FIG. 2.

FIG. 2 is an exploded view of a hard disk drive according to an embodiment of the present invention. FIG. 3 is a bottom view of a cover shown in FIG. 2, and FIG. 4 is a cross-sectional view of a blade shown in FIG. 3.

Figure 4:
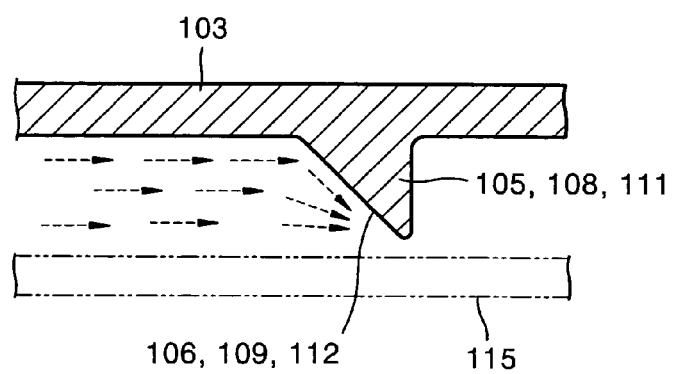
FIG. 4 is a longitudinal cross-sectional view of a blade of FIG. 3.

Referring to FIGS. 2 through 4, a hard disk drive 100 includes a housing 101 having a space inside. A spindle motor 120, a disk 115, an actuator 130, and a recursive filter 150 are disposed in the space in the housing 101.

The housing 101 comprises a base 102 supporting the spindle motor 120 and the actuator 130, and a cover 103 connected to an upper portion of the base 102, to protect the disk 115. According to one embodiment, the housing 101 is made of stainless steel or aluminum.

As is described above, the disk 115 is disposed in the housing 101. The disk 115 may include four or more disks to increase storage capacity, but one or two disks can be used since a surface recording density of disks has increased. Although the hard disk drive 100 shown in FIG. 2 includes one disk, according to one embodiment, the hard disk drive 100 may include two or more disks.

The spindle motor 120 turns the disk 115 and is fixedly mounted on the base 102. A disk clamp 125 is attached to an upper end portion of the spindle motor 120 to prevent the disk 115 from being released.

The actuator 130 moves a magnetic head 145 to write and read data at a desired position on the disk 115, and includes an arm 137, an HGA 138, and a voice coil motor 135. The arm 137 is rotatably coupled to a pivot bearing 132 attached to the base 102. The HGA 138 is coupled to a front end portion of the arm 137, and supports and biases a slider 140, on which the magnetic head 145 is mounted toward a surface of the disk 115. The voice coil motor 135 provides a driving force to rotate the arm 137, and is controlled by a servo control system. The arm 137 is rotated according to Fleming's left-hand rule, in response to interaction between a current input to a VCM coil and a magnetic field generated by magnets. As such, the slider 140 attached to a front end portion of the HGA 138 is moved toward the spindle motor 120 on the disk 115 in a direction indicated by an arrow A, and is moved away from the spindle motor 120 in a direction indicated by an arrow B. The data can be written on both upper and lower surfaces of the disk 115. To this end, the arms 137, the HGAs 138, the sliders 140 and the magnetic heads 145 are provided above and below the disk 115, respectively, but the HGA, the slider and the magnetic head disposed under the disk 115, are not visible in the drawings since they are hidden by the disk 115.

The recursive filter 150 collects and removes foreign substances, such as particles or gas, produced in an interior of the hard disk drive 100, and is detachably connected to an inner surface of the cover 103. The recursive filter 150 is positioned at an exterior of the disk 115 to filter the foreign substances, such as particles, flowing with an air flow caused by the rotation of the disk 115.

The cover 103 of the hard disk drive 100 includes first, second, and third blades 105, 108, and 111 controlling the air flow in the housing 101. The blades 105, 108, and 111 protrude from an inner surface of the cover 103 above and toward the disk 115, do not obstruct operation of the actuator 130, and permit operation of the actuator within an operating range 104 of the actuator 130.

Referring to FIG. 3, a line L1 connecting a first end 105a of the first blade 105 adjacent to a center of the disk 115 to a second end 105b of the blade 105 farthest from the center of the disk 115 is inclined in an angle α1 in the rotational direction D of the disk 115 from a line L2 extending radially from the center of the disk 115. The second and third blades 108 and 111 have the same characteristic. The blades 105, 108, and 111 gradually curve in the rotational direction D of the disk 115 from the first ends 105a, 108a, and 111a to the second ends 105b, 108b, and 111b, to form a spiral shape. Therefore, when the disk 115 rotates, the air between the disk 115 and the cover 103 rotates in the same direction as the rotational direction D of the disk 115, as is shown by dotted arrows in FIG. 3, and is fed to the outer edge of the disk 115. As such, air pressure between the disk 115 and the cover 103 gradually increases from the center of the disk 115 to the outer edge of the disk 115. As a result, vibrations such as disk fluttering decrease because the outer edge of the disk 115 is under an influence of the increased air pressure. While Bernoulli's equation would indicate that the air pressure would decrease as the speed of the air increases, use of Bernoulli's equation assumes an incompressible flow, which in this case, is not a valid assumption.

The second end 108b of the second blade 108 adjacent to the outer edge of the disk 115 is disposed adjacent to the recursive filter 150, such that the air flowing in the same direction as the rotational direction D of the disk 115 is guided to the recursive filter 150. As such, the air is guided to a gap G positioned between the second end 108b of the second blade 108 and a flange 103a of the cover 102, and passes through the recursive filter 150. Thus, compared with the case where is no blade 108, an amount of air not passing through the recursive filter 150 is reduced, thereby more effectively filtering the foreign substances.

Referring to FIG. 4, sides 106, 109, and 112 of the protruded blades 105, 108, and 111 facing the air flow caused by the rotation of the disk 115 are slightly inclined, to guide the air flow toward the surface of the disk 115. Consequently, the air forced toward the outer edge of the disk 115 by the blades 105, 108, and 111 does not form a vortex resulted from blockage by the blades 105, 108, and 111, and thus can be more smoothly guided to the outer edge of the disk 115.

Figure 5:
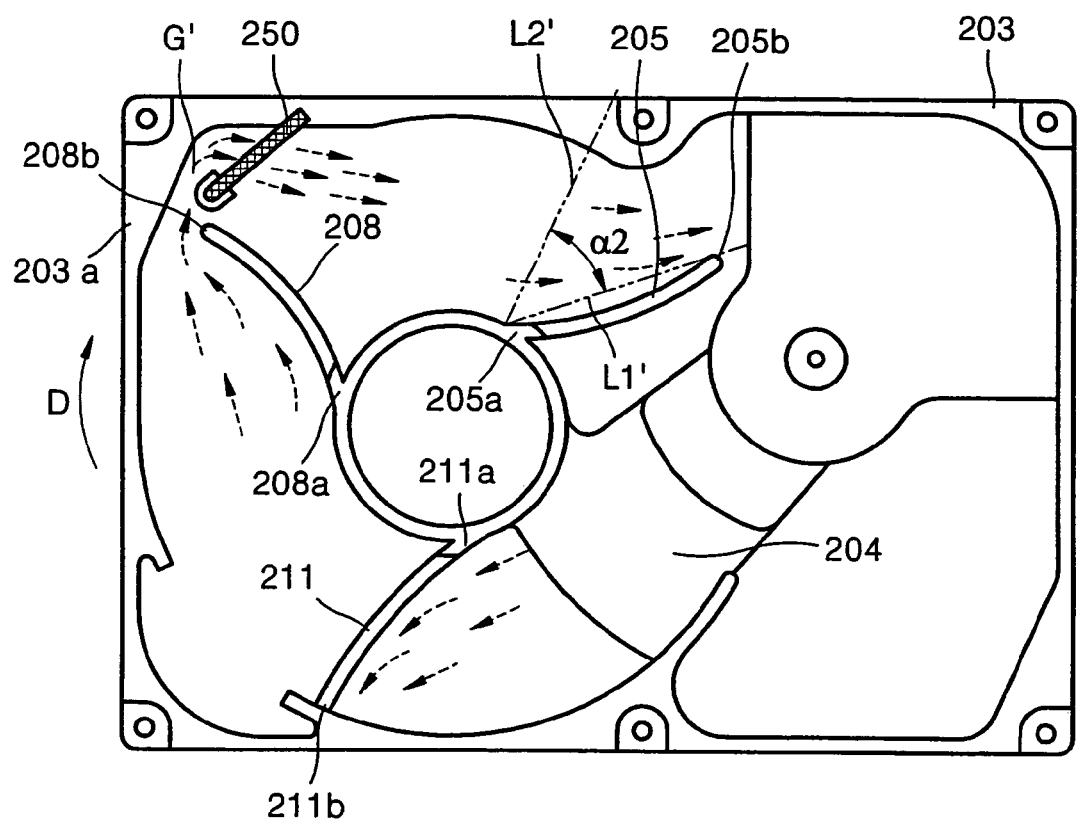
FIG. 5 is a bottom view illustrating a cover of a hard disk drive according to another embodiment of the present invention.

FIG. 5 is a bottom view of a cover of a hard disk drive according to another embodiment of the present invention. The hard disk drive according to the present embodiment has the same components as the hard disk drive according to the previous embodiment in FIG. 2, except that a cover 203 shown in FIG. 5 is used. Elements included in both embodiments are indicated by the same reference numerals, and the difference between the present and previous embodiments will now be described.

Referring to FIG. 5, the cover 203 includes first, second, and third blades 205, 208, and 211 protruding from an inner surface of the cover 203 above and toward the disk 115, do not obstruct the operation of the actuator 130, and permit operation of the actuator within an operating range 204 of the actuator 130.

A line L1' connecting a first end 205a of the blade 205, adjacent the center of the disk 115, to a second end 205b of the blade 205, adjacent to the outer edge of the disk 115, is inclined at an angle α2 in the rotational direction D of the disk 115 from a line L2' extending radially from the center of the disk 115. The second and third blades 208 and 211 have the same characteristic. But in contrast to the previous embodiment, the blades 205, 208, and 211 curve in a direction opposite to the rotational direction D of the disk 115 from the first ends 205a, 208a, and 211a to the second ends 205b, 208b, and 211b, to form a spiral shape. In other words, in the present embodiment, the blades 205, 208, and 211 curve in a direction opposite to the blades 105, 108, and 111 of the previous embodiment. But when the rotating speed of the disk 115 is about 7,200 rpm, although the spiral direction of the blades 205, 208 and 211 is opposite to the rotational direction D of the disk 115, there is no negative influence, such as a vortex, on the air flow. As in the previous embodiment, vibration of the outer edge of the disk 115, such as fluttering, is prevented due to increased air pressure. But if the rotating speed of the disk 115 is increased, vortices may form, thereby causing vibrations.

In the present embodiment, as in the previous embodiment, the second end 208b of the second blade 208 is disposed adjacent to a recursive filter 250, such that the air is guided to a gap G' between the second end 208b of the second blade 208 and a flange 203a of the cover 203, thereby forcing the air to flow through the recursive filter 259, and thus effectively filtering the foreign substances.

To suppress the vibration of the actuator 130 caused by the air flowing in the same direction as the rotational direction D of the disk 115 and colliding against the actuator 130, the first blades 105 and 205 are disposed in front of the actuator 130 (with respect to the rotational direction D) as is shown in FIGS. 3 and 5. Thus, the first blades 105 and 205 block the air flowing to the magnetic head 145, the slider 140 and the HGA 138 of the actuator 130, thereby reducing the vibration of the actuator 130 when the hard disk drive is operating.

Figure 6:
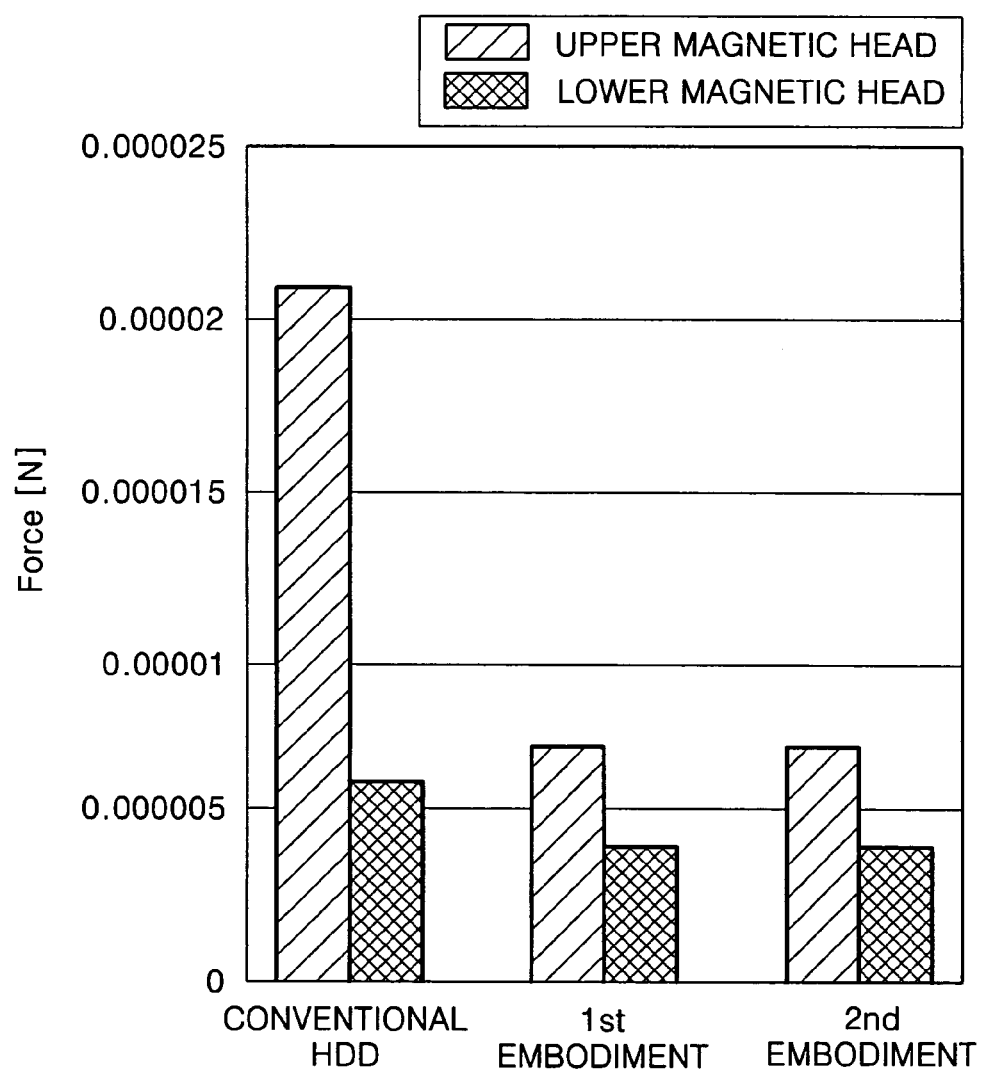
FIG. 6 is a graph illustrating forces applied to magnetic heads during operation of the hard disk drives shown in FIGS. 1, 3, and 5.
Figure 7:
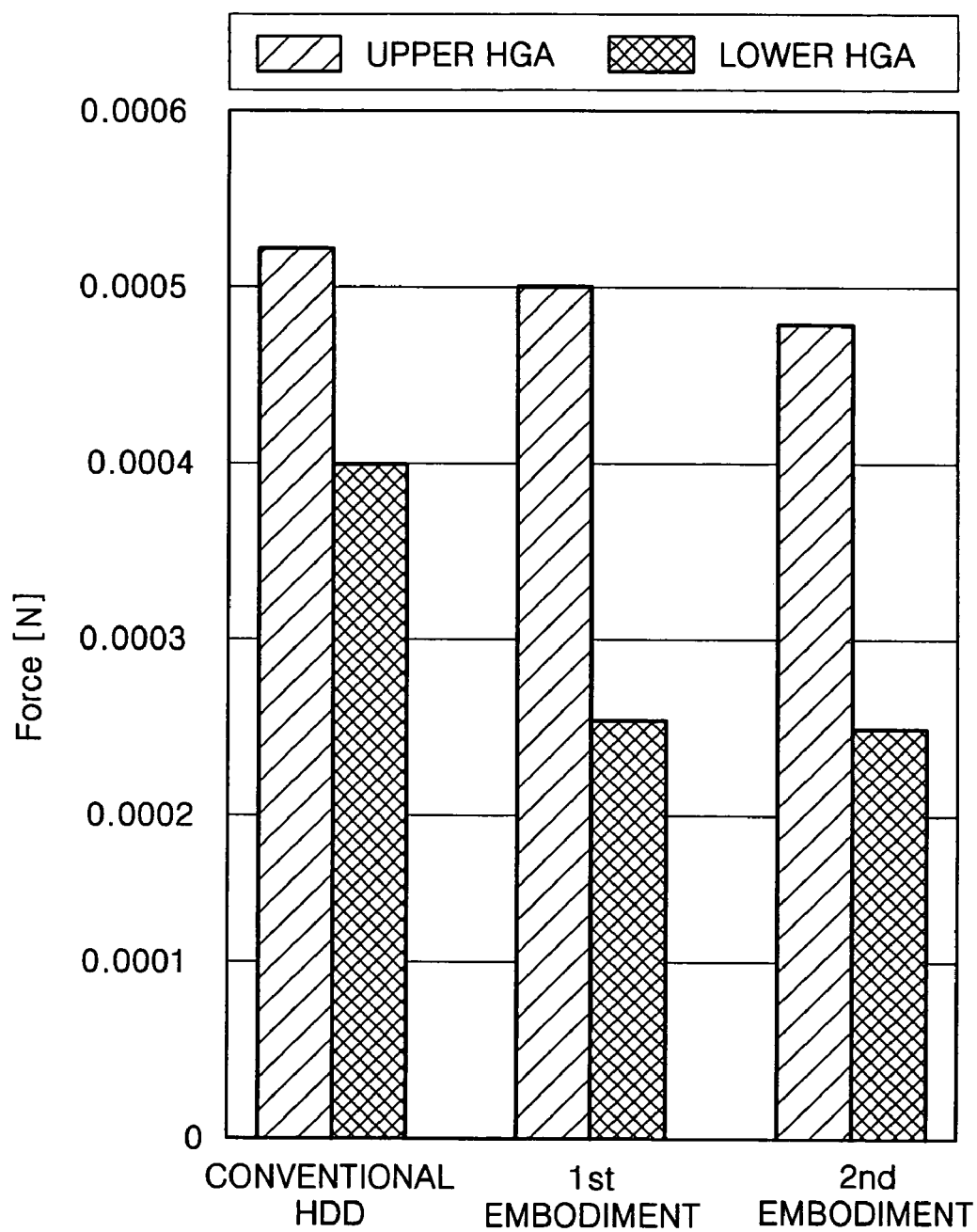
FIG. 7 is a graph illustrating forces applied to HGAs during the operation of the hard disk drives shown in FIGS. 1, 3, and 5.

FIGS. 6 and 7 are graphs illustrating characteristics of the hard disk drives illustrated in FIGS. 3 and 5, and the conventional hard disk drive 10 shown in FIG. 1. FIG. 6 is a graph illustrating forces applied to the magnetic head, and FIG. 7 is a graph illustrating forces applied to the HGAs. Each of the hard disk drives used in the test are two-channel type, which includes a pair of magnetic heads, a pair of sliders, a pair of HGAs, and a pair of arms to record data on both upper and lower surfaces of the disk and read the data from these surfaces. The test was performed at a room temperature under 1 atm, while a rotating speed of the disk was 7,200 rpm.

Referring to FIG. 6, the force applied to the magnetic head by the air flow caused by the rotation of the disk is less in the embodiments of FIGS. 3 and 5 than in the conventional hard disk drive 10. In particular, the force applied to the upper magnetic head closer to the cover is substantially lower in the embodiments of FIGS. 3 and 5. The measured applied force in the embodiment of FIG. 3 is slightly less than the measured applied force in the embodiment of FIG. 5. Referring to FIG. 7, the force applied to the HGAs by the air flow caused by the rotation of the disk is less in the embodiments of FIGS. 3 and 5 than in the conventional hard disk drive 10. From the test results, it can be seen that in the hard disk drives of FIGS. 3 and 5, the force applied to the HGA is smaller than in the conventional hard disk drive 10. Therefore, in the embodiments of FIGS. 3 and 5, the vibration of the actuator is reduced, and the PES characteristics and the writing/reading error characteristics are improved compared to a conventional hard disk drive 10.

As is described above, in a hard disk drive according to the present invention, air flow is fed to the outer edge of a disk by blades to reduce the vibration of the disk. Also, the air flow to an actuator is blocked by the blades, which reduces the vibration of the actuator. The reduction in the vibration results in an improvement of the PES characteristics and the writing/reading error characteristics, a reduction in noise, and an improvement in the reliability of the hard disk drive.

In addition, the air flow is guided to the recursive filter by the blades, thereby improving the filtering of foreign substances, as is described above.

Although a few embodiments of the present invention have been shown and described, it would be appreciated by those skilled in the art that changes may be made in these embodiments without departing from the principles and spirit of the invention, the scope of which is defined in the claims and their equivalents. For example, according to one embodiment, the blades are positioned in the base 102, not the cover 103. According to another embodiment, the blades are positioned in both the base 102 and the cover 103. In addition, according to one embodiment, a plurality of identical blades are disposed at regularly angular intervals in a range not interfering with the operation of the actuator 130.

What is claimed is:

1. A hard disk drive comprising:
a housing including a base and a cover connected to the base;
a spindle motor connected to the base;
a disk mounted to the spindle motor and rotating with respect to the base;
an actuator rotatably connected to the base and including a slider supported by the actuator and a magnetic head mounted on a front end of the slider, the magnetic head writing and/or reading data to and/or from the disk; and
a plurality of blades protruding from at least one of a surface of the base or a portion of the cover facing the disk, and guiding an air flow, caused by rotation of the disk, toward an outer edge of the disk, wherein a side surface of the blade on which the air flow caused by the rotation of the disk is incident is inclined to guide the air flow to a surface of the disk;
wherein the blades are spiral-shaped in a direction opposite to rotation of the disk.

2. The hard disk drive of claim 1, wherein respective lines connecting a first end of each of the blades adjacent to a center of the disk with a second end of the respective blade adjacent to the outer edge of the disk is inclined at a predetermined angle in a rotational direction of the disk from a line extending radially from the center of the disk and passing through the respective first ends of the blades.

3. The hard disk drive of claim 2, wherein the angle is obtuse.

4. The hard disk drive of claim 2, wherein the angle is acute.

5. The hard disk drive of claim 1, wherein each of the blades curves in a rotational direction of the disk from a first end adjacent to a center of the disk to a second end adjacent to the outer edge of the disk, to have a spiral shape.

6. The hard disk drive of claim 1, wherein a surface of the blade on which the air flow caused by the rotation of the disk is incident is inclined to guide the air flow to a surface of the disk.

7. The hard disk drive of claim 1, wherein the blade is disposed before the actuator with respect to a direction of the air flow, to block the air flow caused by the rotation of the disk from flowing to the actuator.

8. The hard disk drive of claim 1, further comprising a recursive filter disposed outside an outer edge of the disk, wherein an end of one of the blades adjacent to the outer edge of the disk is disposed before the recursive filter with respect to a direction of the air flow, to guide the air flow caused by rotation of the disk toward the recursive filter.

9. The hard disk drive of claim 1, wherein the blades have the same shape, and are disposed at regular angular intervals.

10. A cover for a hard disk drive having a base, a cover connected with the base, and an actuator rotatably connected with the base to read and/or write data from and/or to a disk, the cover comprising:

Curved blades extending toward the disk to guide an air flow induced by rotation of the disk to an outer edge of the disk, to reduce disk vibration, one of the blades being positioned upstream of the actuator, adjacent an operating range of the actuator, to suppress vibration of the actuator, wherein a side surface of the blade on which the air flow caused by the rotation of the disk is incident is inclined to guide the air flow to a surface of the disk;

Wherein the blades are spiral-shaped in a direction opposite to rotation of the disk.

11. A hard disk drive comprising:

a housing including a base and a cover connected to the base;

a rotatable disk mounted to a spindle motor; and a plurality of blades protruding toward the disk from either surface of the base or a surface of the cover, and guiding an air flow, caused by rotation of the disk, toward an outer edge of the disk, wherein a side surface of each of the blades on which the air flow caused by the rotation of the disk is incident is inclined to guide the air flow to a surface of the disk wherein the blades are spiral-shaped in a direction opposite to rotation of the disk.

* * * * *

UNITED STATES PATENT AND TRADEMARK OFFICE
CERTIFICATE OF CORRECTION

PATENT NO.         : 7,450,338 B2                                        Page 1 of 1
APPLICATION NO.    : 11/019172
DATED              : November 11, 2008
INVENTOR(S)        : Sung-chul Hur It is certified that error appears in the above-identified patent and that said Letters Patent is hereby corrected as shown below:

Title Page, Column 1 (Title), Line 3, change "VIBRATION" to --VIBRATIONS--.

Column 1 (Title), Line 3, change "VIBRATION" to --VIBRATIONS--.

Signed and Sealed this

Seventeenth Day of February, 2009

JOHN DOLL
*Acting Director of the United States Patent and Trademark Office*